United States Patent Office 2,837,220
Patented June 3, 1958

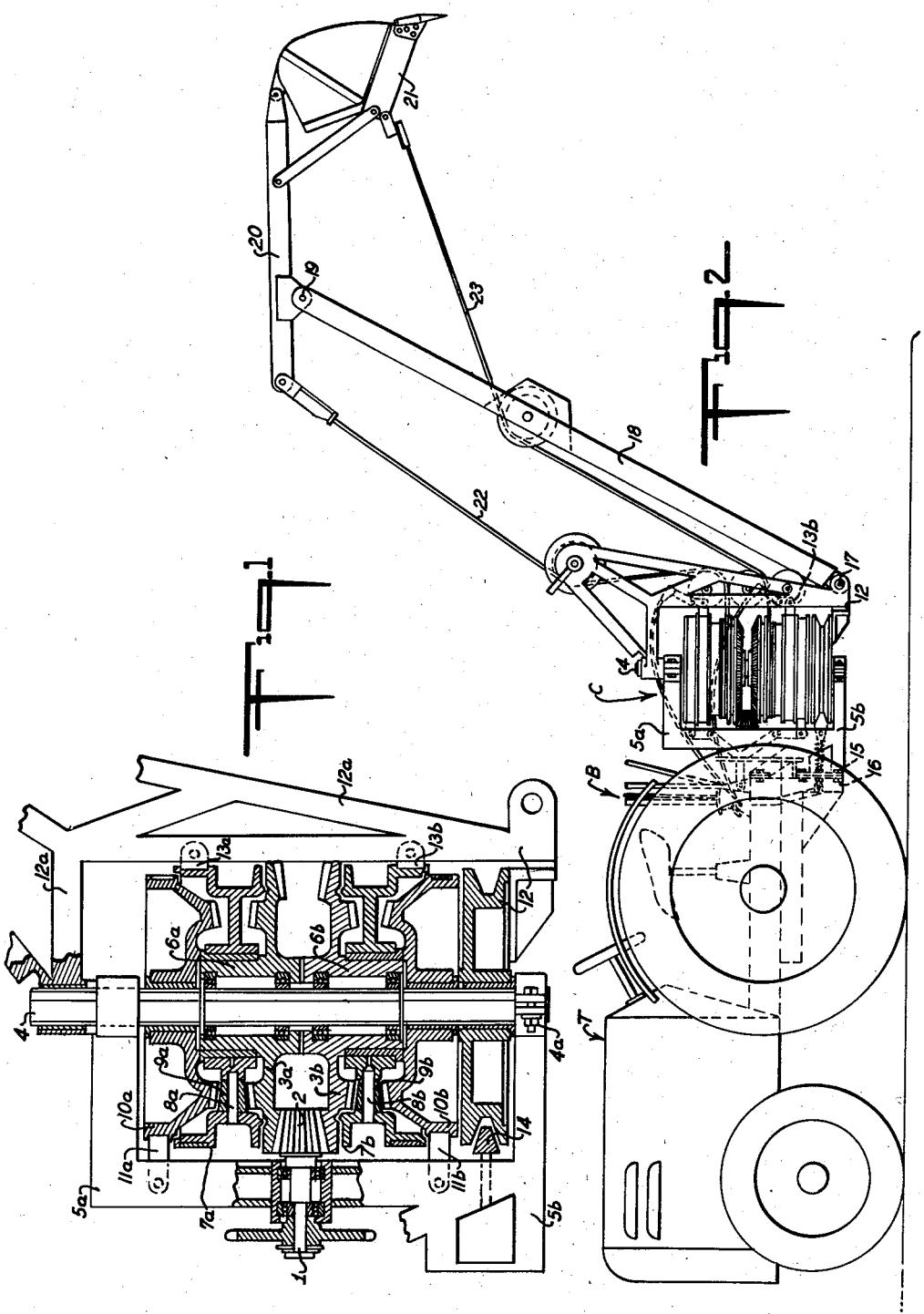

2,837,220

LIFT AND TRANSPORT MECHANISM

Hannes Pehkonen, Temmes, and Eeli Lempinen, Liminka, Finland, assignors to Raahe Oy, Raahe, Finland, a company of Finland Application November 18, 1953, Serial No. 392,878

4 Claims. (Cl. 212—59)

This invention relates to mechanisms for lifting and transporting and of the type comprising one or more rotary cable drums mounted on an axle, devices for transmitting the driving motion to the cable drums, a turntable and devices for effecting turning of this turntable.

In known lifting and transporting mechanisms or hoists the cable drums are usually mounted on a horizontal axle fitted on the turntable, which, in turn, is rotatable about a vertical axle. One of the defects of a hoist mechanism of the described character is that it requires a very considerable amount of space, which is a drawback, for example, when the mechanism is to be used as an attachment or accessory on a tractor.

The present invention has as an object the provision of a lifting and transporting mechanism or hoist which is simple in its construction, requires a minimum of space, and, which is suitable for connection to a tractor for use in digging ditches and the like.

A lifting and transporting mechanism or hoist in accordance with the invention is characterized by the fact that the cable drum or drums and the turntable are mounted on a common axle and that means are provided by which the rotation of the cable drum or drums can be employed for rotating the turntable.

The principle of the invention is illustrated by the accompanying drawing wherein: Figure 1 illustrates a lifting and transporting mechanism in accordance with one embodiment of the invention in vertical section; and Figure 2 illustrates the mechanism mounted on a tractor.

The driving motion is transmitted from a suitable source of power (not shown) on a tractor or like device T to an axle 1 and is transferred through a bevel wheel 2 on the same axle to cog-wheels 3a and 3b which are rotatable about a vertical axis. Particularly, the cog-wheels 3a and 3b are rotatably mounted on the vertical axle 4, the ends of which are secured as by bolt 4a to frame supports 5a and 5b fixed to the tractor. Rotatably supported on axially extending spindles 6a and 6b of the cog-wheels 3a and 3b are cable drums 7a and 7b, respectively. The cable drums 7a and 7b are provided with radially extending spindles 8a and 8b, respectively, on which are mounted small bevel wheels 9a and 9b. The bevel wheels 9a and 9b are arranged in pairs at diametrically opposed locations with respect to the axle 4. The small bevel wheels 9a and 9b simultaneously mesh at one side with cog-wheels 3a and 3b and at their other side with corresponding peripheral teeth on the brake drums 10a and 10b. Brake drums 10a and 10b are mounted on the axle 4 and are engageable by the brake shoes 11a and 11b fixed at one end to the frame 5a and 5b and at the other end to a brake lever (not shown) pivoted on the frame and by which the rotation of the brake drums can be regulated with respect to frame 5a and 5b. The above described structure forms a planetary unit.

According to the main characteristic of a hoist embodying the invention there is mounted on axle 4 a turntable 12. On a frame 12a rotatable with the turntable 12 are fixed at one of their ends brake shoes 13a and 13b, by which the rotation of the cable drums 7a and 7b, respectively, can be retarded or halted relative to the turntable 12 by actuation of a further brake lever (generally indicated at B) also pivoted on the frame 5a and connected to the other ends of the shoes 13a and 13b by a Bowden wire (generally indicated at C). The fixed frame 5b is provided with a brake shoe 14 engageable with the turntable 12 and by which rotation of the turntable can be retarded or halted relative to the frame 5a and 5b.

When the axle 1 of the above described device is rotated, the bevel gear 2 will effect rotation of the cog-wheels 3a and 3b in the opposite directions. If turning of the turntable 12 is resisted by setting of the brake shoe 14, and if the brake shoe 11a is released to permit rotation of the brake drum 10a, the bevel gears 9a will be unable to impart rotary motion to the drum 7a about the axle 4 and will merely roll on the teeth of the brake drum 10a, and the cable drum 7a may be held non-rotatable by the engagement or setting of the brake shoe 13a. Similarly, the brake shoe 11b may be released to permit rotation of the brake drum 10b while the cable drum 7b is held non-rotatable by setting of the brake shoe 13b. When it is desired to effect rotation of the cable drum 7a, the brake shoe 11a is set or applied to resist rotation of the brake drum 10a, and the brake shoe 13a is released in order to permit rotation of the brake drum 7a relative to the turntable 12. Thus it is seen that the brake drums 10a and 10b can be set to give the bevel gears 9a and 9b fixed mating members against which to operate.

When it is desired to effect rotation of the brake drum 7b, the brake shoe 11b is applied or set against the brake drum 10b and resists rotation of the latter, while the brake shoe 13b is released to permit rotation of the cable drum 7b. Thus, it is apparent that the brake drums 10a and 10b, controlled by the brake shoes 11a and 11b, are effective to regulate the rotation of the brake drums 7a and 7b, respectively.

Further, in a mechanism constructed in the manner described above, the brake shoes 13a and 13b engageable with the cable drums 7a and 7b, respectively, are adapted to transmit the rotational movement of one or the other of the cable drums to the turntable 12. Thus, when it is desired to effect rotation or turning of the turntable 12 in the direction of rotation of the cable drum 7a, the brake shoes 13b and 14 are released to free the turntable for rotation relative to the cable drum 7b and the fixed frame, respectively, while the brake shoes 11a and 13a are set against the brake drum 10a and the cable drum 7a, respectively, whereby the cable drum 7a is rotated, and the turntable is drawn along by the cable drum in the direction of rotation of the latter. If it is desired to effect turning or rotation of the turntable 12 in the opposite direction, that is, in the direction of rotation of the cable drum 7b, the brake shoe 13a is released, along with the release of the brake shoe 14, while the brake shoes 11b and 13b are set or applied against the brake drum 10b and the cable drum 7b, so that the cable drum 7b is then rotated and carries along the turntable 12 in the direction of rotation of that cable drum.

The above described lifting and transporting mechanism can by means of frame supports 5a and 5b be secured, for example, on the rear end of a tractor T suitably with axle 4 in a vertical position. A tractor equipped with an attachment or accessory of this kind can be used for work such as ditch digging. When the mechanism is used for ditch digging a shovel supporting beam is secured to the turntable 12. The cable for lifting the beam is arranged on drum 7a and the cable for manipulation of the shovel is arranged on drum 7b. The operations involved in ditch digging are performed as follows:

For lowering the shovel beam the brake 11a is released, thereby to permit the drum 7a to rotate freely relative to the fixed frame, and at the same time the brakes 13a and 11b are released and brakes 13b and 14 are set. For obtaining traction motion for the shovel the brake 11b is applied or set and brake 13b is released so that the driving motion is transferred from axle 1 through bevel gear 2 to cog-wheel 3b and by means of the small cog-wheels 9b to cable drum 7b. The brakes 13a and 11a are still released, whereas brake 14 is set. For lifting the beam the brake 11a is applied or set so that the driving motion is transferred from axle 1 through bevel gear 2 to cog-wheel 3a and by means of the small cog-wheels 9a to cable drum 7a. The brakes 13b and 14 are now applied and brakes 11b and 13a are released.

The turning motion of the turntable and beam about axle 4 is obtained as previously explained by applying brakes 13a and 11a or the brakes 13b and 11b, depending upon the direction of the turning movement that is desired.

By applying brakes 11a and 11b the driving motion can thus be transmitted to cable drums 7a and 7b and by applying brakes 13a and 13b the driving motion can be transmitted to turntable 12 for turning the same in different directions. Application of brake 14 is effective to stop the turning movement of the turntable 12.

The device is connected to the tractor T by means of bolts 16 passing through plate 15. The frame 5a, 5b and axle 4 are thus kept in fixed position with respect to the tractor T. The device is worked by levers B which effect movement of brake shoes 11a, 11b, 13a and 13b and 14. On the turntable 12 there is, at point 17, a rotatably mounted beam 18 on the upper end of which there is mounted, pivotally, at point 19 a beam 20. At the end of beam 20 is mounted a shovel 21. Over the upper cable drum 7a runs a cable 22 secured to the beam 20. A cable 23 from the lower cable drum 7b is secured to the shovel 21. The lifting and lowering motion for the beam 18 as well as the motion required for the pivotal beam 20 at point 19 is obtained by means of these cables.

We claim:

1. A hoist mechanism comprising a frame, an axle fixedly mounted on said frame, first and second cable drums rotatably mounted on said axle, means for selectively effecting rotation of said first and second cable drums in opposed rotational directions, a turntable rotatably mounted on said axle to turn relative to said frame about an axis concentric with the axes of rotation of said cable drums, and brake means operative to releasably couple said turntable to a selected one of said cable drums so that the turntable can be driven in the opposite rotational directions from the related cable drums.

2. A hoist mechanism according to claim 1; wherein said means for selectively effecting rotation of said first and second cable drums includes a driven shaft normal to said axle, a driving gear on said shaft, two confronting cog-wheels rotatable on said axle, said driving gear simultaneously meshing, at diametrically opposed locations on its periphery, with said cog-wheels to rotate the latter in opposite directions, each of said cable drums rotatably carrying planetary pinions meshing with a related one of said oppositely rotated cog-wheels, a brake drum for each of said cable drums and rotatably mounted on said axle for movement independent of the related cable drum, each of said brake drums having an annular gear thereon meshing with the planetary pinions of the related cable drum whereby the latter is rotated in response to arresting of the rotation of the related brake drum, and brake shoes carried by said frame and engageable with the brake drums related to the first and second cable drums, respectively, to selectively arrest the rotation of said brake drums.

3. A hoist mechanism according to claim 1; wherein said brake means includes a braking surface on each of said first and second cable drums, and first and second brake shoes carried by said turntable and selectively engageable with said braking surfaces of the first and second cable drums, respectively, to cause said turntable to follow the rotation of the cable drum having the braking surface with which one of said brake shoes is then engaged.

4. A hoist mechanism according to claim 3; further comprising braking means carried by said frame and releasably engageable with said turntable for preventing rotation of the latter about said axle.

References Cited in the file of this patent

UNITED STATES PATENTS

| | | |
|---|---|---|
| 1,998,565 | Lucas | Apr. 23, 1935 |
| 2,199,668 | Lawler | May 7, 1940 |
| 2,543,765 | Davidson et al. | Mar. 6, 1951 |

FOREIGN PATENTS

| | | |
|---|---|---|
| 25,009 | Great Britain | Oct. 30, 1909 |